United States Patent
Eizenga et al.

(10) Patent No.: US 10,011,786 B1
(45) Date of Patent: Jul. 3, 2018

(54) HYDROCRACKING PROCESS AND APPARATUS WITH HPNA REMOVAL

(71) Applicant: UOP LLC, Des Plaines, IL (US)

(72) Inventors: Donald A. Eizenga, Elk Grove Village, IL (US); Richard K. Hoehn, Mount Prospect, IL (US); Michael J. Pedersen, Vernon Hills, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 15/445,681

(22) Filed: Feb. 28, 2017

(51) Int. Cl.
*C10G 67/06* (2006.01)
*B01D 15/18* (2006.01)

(52) U.S. Cl.
CPC ......... *C10G 67/06* (2013.01); *B01D 15/1814* (2013.01); *B01D 15/1871* (2013.01); *B01D 15/1885* (2013.01)

(58) Field of Classification Search
CPC ............... C10G 67/06; B01D 15/1885; B01D 15/1871; B01D 15/1814
See application file for complete search history.

(56) References Cited

U.S. PATENT DOCUMENTS

| | | | |
|---|---|---|---|
| 3,130,006 A | 4/1964 | Rabo et al. | |
| 4,363,718 A | 12/1982 | Klotz | |
| 4,447,315 A | 5/1984 | Lamb et al. | |
| 6,379,535 B1 | 4/2002 | Hoehn et al. | |
| 8,574,425 B2 | 11/2013 | Hoehn et al. | |
| 2013/0220885 A1* | 8/2013 | Low | C10G 47/00 208/85 |
| 2014/0323788 A1* | 10/2014 | Richmond | C10G 25/00 585/802 |

* cited by examiner

*Primary Examiner* — Randy Boyer
*Assistant Examiner* — Juan C Valencia

(57) ABSTRACT

One exemplary embodiment can be a process for treating a hydrocracking fraction. The process can include obtaining a bottom stream from a fractionation column, stripping HPNAs from the bottoms stream and adsorbing HPNAs from the stripped stream to provide an adsorbed stream that can meet a desired HPNA concentration specification. The adsorption step can be adjusted to achieve an adjusted HPNA concentration.

18 Claims, 1 Drawing Sheet

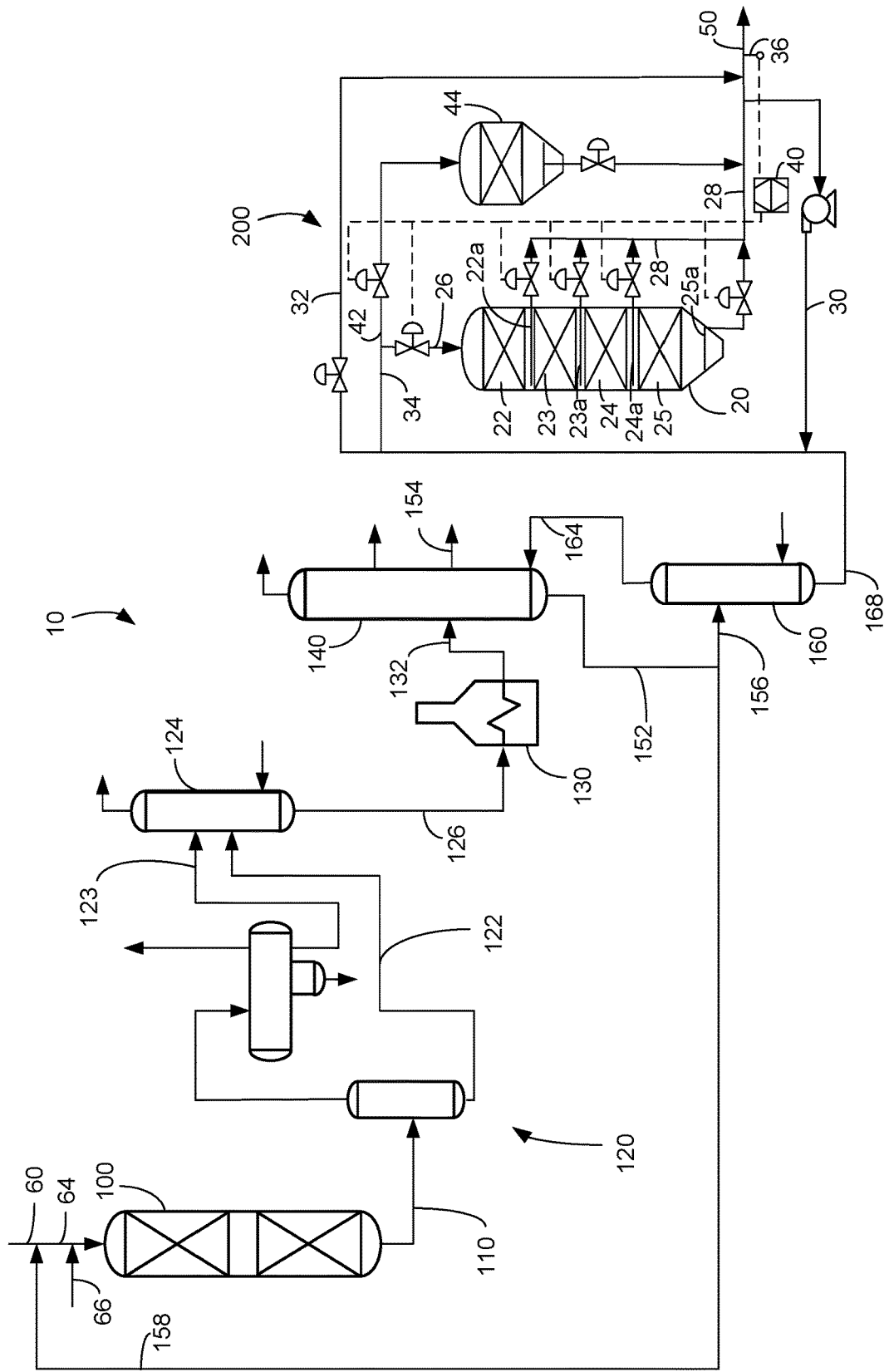

HYDROCRACKING PROCESS AND APPARATUS WITH HPNA REMOVAL

FIELD

This field generally relates to a process and apparatus for removing HPNAs from a hydrocracked stream.

BACKGROUND

Often, heavy polynuclear aromatic (HPNA) compounds may be a secondary byproduct from a hydrocracking process. The HPNA compounds can be a problem particularly for high conversion hydrocracking units, and be present in the reactor product. Recycling unconverted oil to increase yields of distillate product can result in an accumulation of HPNA compounds in the recycled oil. Accumulated HPNA compounds in the recycle oil may deposit on the catalyst as coke, which may degrade catalyst performance and result in shorter catalyst cycle length. Production of undesired HPNA compounds can be more pronounced for hydrocracking units processing heavier feeds. Thus, it would be desirable to remove the HPNA compounds from the unconverted oil so as to minimize the catalyst deactivation.

One way to remove HPNAs is to lower conversion by bleeding a portion of the unconverted oil to limit the accumulation of HPNA compounds. Unfortunately, this is often undesirable due to economic and logistic considerations because of yield loss and lack of market for the unconverted oil. In order to minimize the bleed rate of unconverted oil, schemes such as carbon bed absorption of the recycle oil stream to remove HPNAs and stripping columns to concentrate the HPNAs in an unconverted oil waste stream have been commercially implemented. Disposition of HPNA concentrated streams within the refinery can be problematic. If a refinery does not have a fuel oil system or an outlet for heavy bunker fuel oils, demand for which is decreasing due to increasing environmental restrictions on the use of heavy fuel oil, or an FCC unit, there may not be a good outlet for the HPNA concentrated stream.

Attempts to recirculate unconverted oil through the crude, vacuum column and coker units have in some cases led to HPNA recirculation back to the hydrocracking unit where accumulation of HPNAs led to increased fouling and catalyst deactivation. In addition, if the unconverted oil which has high HPNA content must be stored and transported to a suitable location, the storage and transfer temperatures must be kept at a level so as to prevent HPNAs from precipitating out of solution and depositing on the piping or equipment.

It would be desirable to control the level of HPNAs in the unconverted oil stream, so that it can be handled appropriately within the refinery at reduced cost.

SUMMARY

A process and apparatus provides an unconverted oil stream from a hydrocracking reactor with an adjusted concentration of HPNAs. In an aspect, an adsorption zone may provide a variable space velocity to maintain HPNA concentration in a specified range. In a further aspect, multiple adsorbent beds in series may be utilized with flow going to only one or some of the beds and then going to additional adsorbent beds in the series when the HPNA concentration of the adsorbed stream exceeds a predetermined maximum value.

Definitions

As used herein, the term "stream" can include various hydrocarbon molecules, such as straight-chain, branched, or cyclic alkanes, alkenes, alkadienes, and alkynes, and optionally other substances, such as gases, e.g., hydrogen, or impurities, such as heavy metals, and sulfur and nitrogen compounds. The stream can also include aromatic and non-aromatic hydrocarbons. Moreover, the hydrocarbon molecules may be abbreviated C1, C2, C3 ... Cn where "n" represents the number of carbon atoms in the one or more hydrocarbon molecules. Furthermore, a superscript "+" or "−" may be used with an abbreviated one or more hydrocarbons notation, e.g., $C3^+$ or $C3^-$, preferably is inclusive of the abbreviated one or more hydrocarbons. As an example, the abbreviation "$C3^+$" means one or more hydrocarbon molecules of more than three carbon atoms an preferably three and more carbons.

As used herein, the term "rich" can identify a stream from a separation unit such as a stripper that has a greater concentration of a compound or a class of compounds than in a feed stream to the separation unit.

As used herein, the term "lean" can identify a stream from a separation unit such as a stripper that has a smaller concentration of a compound or a class of compounds than in a feed stream to the separation unit.

As used herein, the term "substantially" can mean an amount of at least generally about 80%, preferably about 90%, and optimally about 99%, by mole, of a compound or class of compounds in a stream.

As used herein, the term "hydrocracking" can refer to a process for cracking hydrocarbons in the presence of hydrogen, and optionally a catalyst, to lower molecular weight hydrocarbons.

As used herein, the term "heavy polynuclear aromatics" may be abbreviated "HPNA" and can characterize compounds having seven, and preferably, ten or more "benzene rings" typically produced in a hydrocracking reaction zone.

As used herein, the term "fluid" can mean one or more gases, one or more liquids, and/or one or more vapors.

As used herein, the term "gas" can mean a single gas or a solution of a plurality of gases.

As used herein, the term "liquid" can mean a single liquid, or a solution or a suspension of one or more liquids with one or more gases and/or solid particles.

As used herein, the term "vapor" can mean a gas or a dispersion that may include or consist of one or more hydrocarbons and/or water. A dispersion may include one or more of a gas, a liquid, and a solid, such as a dispersion of an aerosol and/or a fog.

As used herein, the term "top" can be at or near the top of a vessel.

As used herein, the term "bottom" can be at or near the bottom of a vessel.

As used herein, the term "non-distillable component" can include finely divided particulate matter that can tend to foul hot heat exchange surfaces, form coke on catalyst, deactivate catalyst, and/or plug catalyst beds. Generally, the finely divided particulate matter can include polymerized organic matter.

As used herein, the term "space velocity" can include the ratio of the volume or mass of the treated material to the volume or mass, respectively, of an adsorbent or catalyst.

As used herein, the term "kilopascal" may be abbreviated "kPa" and all pressures disclosed herein are absolute; the term "hour" may be abbreviated "hr"; the term "kilogram" may be abbreviated "kg"; the term "meter-cubed" may be abbreviated "$m^3$"; and the term "liquid hourly space velocity" may be abbreviated "LHSV".

As used herein, a boiling point of a stream may be determined by ASTM Method D2887-97, unless another method is specified.

As depicted, process flow lines in the figures can be referred to interchangeably as, e.g., lines, pipes, feeds, distillates, condensates, remainders, mixtures, portions, hydrocarbons, effluents, products, or streams.

BRIEF DESCRIPTION OF THE DRAWING

The FIGURE is a schematic depiction of an exemplary embodiment.

DETAILED DESCRIPTION

Referring to the FIGURE, one exemplary embodiment of an apparatus and process 10 is depicted. The apparatus and process 10 can include a hydrocracking reactor 100, a heater 130, a fractionation column 140, a recycle stripping column 160, and an adsorption zone 200. A hydrocracking feed 60 can be provided to the apparatus and process 10.

The hydrocracking feed 60 may be a hydrocarbonaceous oil containing hydrocarbons and/or other organic materials to produce a product containing hydrocarbons and/or other organic materials of lower average boiling point and lower average molecular weight. The hydrocracking feed 60 may include mineral oils and synthetic oils, e.g., shale oil, and tar sand products, and fractions thereof. An illustrative hydrocracking feed 60 includes those containing components initially boiling above about 285° C., such as atmospheric gas oils; vacuum gas oils; deasphalted, vacuum, and atmospheric residua; hydrotreated or mildly hydrocracked residual oils; coker distillates; straight run distillates; solvent-deasphalted oils; pyrolysis-derived oils; high boiling synthetic oils; cycle oils; and cat cracker distillates. One exemplary preferred hydrocracking feed 60 is a gas oil or other hydrocarbon fraction having at least about 50%, by weight, of its components boiling at temperatures above the end point of the desired product such as about 360° C. One exemplary hydrocracking feed 60 may contain one or more hydrocarbon components boiling above about 285° C., preferably containing at least about 25%, by volume, of the components boiling about 310° to about 540° C. The hydrocracking feed 60 may be combined with a recycle stream 158, as hereinafter described, to form a combined stream 64 and provided to the hydrocracking reactor 100. Hydrogen may be added to the combined stream 64 in line 66 or directly to the hydrocracking reactor.

The hydrocracking reactor 100 can include a single reactor or multiple reactors, and undertake processes such as hydrocracking and hydrotreating. The hydrocracking reactor 100 can include a hydrocracking catalyst utilizing amorphous bases or low-level zeolite bases combined with one or more metals of groups 6 and 8-10 of the periodic table acting as hydrogenating metals and promoters. In another embodiment, the catalyst can include any crystalline zeolite cracking base upon which is deposited a minor proportion of a metal of groups 8-10 of the periodic table. The hydrogenating components may also be selected from group 6 of the periodic table for incorporation with a zeolite base. Hydrogenating metals can include one or more of iron, cobalt, nickel, ruthenium, rhodium, palladium, osmium, iridium and platinum and may include molybdenum and tungsten. The amount of hydrogenating metal in the catalyst can vary within wide ranges, such as about 0.05 to about 30%, by weight, based on the weight of the catalyst. In the case of the noble metals, e.g., platinum and palladium, about 0.05 to about 2%, by weight, may be used.

The zeolite bases may be referred to as molecular sieves and composed of silica, alumina and one or more exchangeable cations such as sodium, magnesium, calcium, and at least one rare earth metal. They can be further characterized by crystal pores of relatively uniform diameter of about 4 to about 14 Angstroms. Suitable zeolites may include mordenite, stilbite, heulandite, ferrierite, dachiardite, chabazite, erionite and faujasite, and beta, X, Y and L crystal types, e.g., synthetic faujasite and mordenite. Generally, one exemplary zeolite is a synthetic Y molecular sieve.

The original zeolitic monovalent metals can be ion-exchanged with a polyvalent metal and/or with an ammonium salt followed by heating to decompose the ammonium ions associated with the zeolite, leaving in their place hydrogen ions and/or exchange sites, which may be decationized by further removal of water. Exemplary hydrogen or decationized Y zeolites are disclosed in, e.g., U.S. Pat. No. 3,130,006.

Mixed polyvalent metal-hydrogen zeolites may be prepared by ion-exchanging first with an ammonium salt, then partially back exchanging with a polyvalent metal salt and then calcining. In some cases, the hydrogen forms can be prepared by direct acid treatment of the alkali metal zeolites.

One preferred method for incorporating the hydrogenating metal is contacting the zeolite base material with an aqueous solution of a suitable compound of the desired metal wherein the metal may be present in a cationic form. Following addition of the selected hydrogenating metal or metals, the resulting catalyst powder may be then filtered, dried, pelleted with added lubricants, binders or the like, if desired, and calcined in air at temperatures of, e.g., about 370° to about 650° C. in order to activate the catalyst and decompose ammonium ions. Alternatively, the zeolite component may first be pelleted, followed by the addition of the hydrogenating component and activation by calcining. The foregoing catalysts may be employed in undiluted form, or the powdered zeolite catalyst may be mixed and copelleted with other relatively less active catalysts, diluents or binders such as alumina, silica gel, silica-alumina cogels, and activated clays in proportions ranging of about 5 to about 90%, by weight, based on the weight of the catalyst. These diluents may be employed as such or they may contain a minor proportion of an added hydrogenating metal of groups 6 and 8-10 of the periodic table.

Additional metal promoted hydrocracking catalysts may also be utilized, which can include aluminophosphate molecular sieves, crystalline chromosilicates, and other crystalline silicates. Such crystalline chromosilicates are disclosed in, e.g., U.S. Pat. No. 4,363,718.

The hydrocracking of a feed with a hydrocracking catalyst can be conducted in the presence of hydrogen and preferably at hydrocracking reactor conditions at a temperature of about 230° to about 470° C., a pressure of about 3,450 to about 20,690 kPa, an LHSV of about 0.1 to about 30 hr$^{-1}$, and a hydrogen circulation rate of about 330 to about 25,000 normal m$^3$/m$^3$. Such feeds and hydrocracking reactors are disclosed in, e.g., U.S. Pat. No. 4,447,315 and U.S. Pat. No. 6,379,535.

A hydrocracked stream in hydrocracking effluent line 110 may be provided to a heater 130, and heated to any suitable temperature, such as about 140° to about 400° C., and provided to a fractionation column 140 in downstream communication with the hydrocracking reactor 100 for fractionating the hydrocracked stream. The hydrocracked stream may be first separated in a series of separators 120 to provide one or two hydrocracked liquid streams in lines 122 and/or 123 and stripped in a stripping column 124 by an inert gas such as steam to remove gases, including light hydrocarbons and hydrogen sulfide, and provide a stripped liquid hydrocracked stream in line 126 prior to heating in heater 130. More than one stripping column 124 may be used.

The fractionation column 140 may include one or more trays, which can include bubble caps or other suitable vapor/liquid contacting devices. The column 140 can operate with a flash zone temperature of about 330° to about 390° C. and a pressure of about 13 to about 138 kPa (absolute). The fractionation column 140 may comprise two fractionation columns with one operating at vacuum pressure. The heated hydrocracked stream in line 132 can be provided to the fractionation column 140 with the lighter components passing upward and lighter products withdrawn further up the column 140, and the heavier components exiting the column 140, such as in a fractionated bottom stream in a bottoms line 152. A diesel stream can be removed from a side of the fractionation column in line 154.

The bottom stream 152 can be split into a process fractionated bottoms stream in process line 156 and the recycle stream 158 that is recycled to the hydrocracking reactor 100. The recycle stream in recycle line 158 may be combined with the hydrocracking feed 60 to provide the combined stream 64, as described above. The process fractionated bottoms stream in the process line 156 may be provided to the recycle stripping column 160, which can include a drum. The recycle stripping column 160 may be in downstream communication with the fractionation column 140 for stripping the fractionated stream in the bottoms line 152.

The recycle stripping column 160 can be operated at any suitable conditions to strip the process fractionated bottoms stream with an inert gas such as steam, to provide a top stream in overhead line 164 lean in HPNAs and a stripped stream in stripped line 168 concentrated in HPNAs. In an embodiment, the stripping column 160 may be provided in a bottom of the fractionation column 140 configured as a split shell column which is not shown. The top stream in the overhead line 164 may be returned to the fractionation column 140 to have valuable products recovered from it.

The stripped stream in stripped line 168 can include non-distillable components such as HPNA compounds, one or more C24+ hydrocarbons, and may have a boiling point of at least about 370° C. The stripped stream may be forwarded to an adsorption zone 200 to have HPNAs adsorbed from the stripped stream to provide an adsorbed stream with a desired HPNA concentration. The adsorption zone 200 may be in downstream communication with the recycle stripping column 160 for adsorbing HPNAs in the stripped stream in line 168.

The adsorbent zone 200 may include multiple adsorbent beds 22-25 in series, so the stripped stream in stripped line 168 may be adsorbed over multiple beds in series. The stripped stream in stripped line 168 may comprise about 500 to about 3000 wppm HPNAs and suitably about 900 to about 1500 wppm HPNAs. The stripped stream may be combined with a recycle stream in line 30 before feeding an adsorption line 34. Alternatively, all or a portion of the stripped stream may be diverted to a bypass line 32. The multiple adsorbent beds 22-25 may be contained in the same vessel 20 as shown in the FIGURE. It is also contemplated that the adsorbent beds 22-25 in series may be contained in one or more separate vessels which are not shown.

Each adsorbent bed 22-25 may have a withdraw line 22a-25a in communication with the respective bed and a control valve on the withdraw line. The withdraw lines 22a-25a may be located in a volume in the vessel 20 preferably just below the respective bed 22-25 and have an inlet for withdrawing adsorbed liquid that has been in contact with the adsorbent in the respective bed and perhaps exited the respective bed. The withdraw lines 22a-25a may comprise pipes with openings in the pipes in communication with the respective bed 22-25 for withdrawing the adsorbed liquid. The adsorbed liquid from the withdraw lines 22a-25a may be collected in a manifold line 28.

The adsorption zone 200 may operate to vary the space velocity in the adsorption process. The stripped stream in line 34 may be directed to a first adsorbent bed 22 in which HPNAs are adsorbed from the stripped stream through an adsorbent feed line 26 with an open control valve thereon. The first adsorbent bed 22 may be an upstream adsorbent bed 22 of the multiple adsorbent beds 22-25. In an initial condition, a control valve on a withdraw line 22a may be an upstream control valve on an upstream withdraw line 22a that is open while downstream control valves on downstream withdraw lines 23a, 24a and 25a are closed. In the initial condition, stripped liquid from the adsorbent feed line 26 will fill the vessel 20 but only exit through withdraw line 22a, so additional stripped liquid entering the vessel 20 after the vessel is filled will only run through the upstream adsorbent bed 22. An HPNA concentration measuring device 36 on a product line 50 in downstream communication with the manifold line 28 can be used to measure the concentration of the HPNAs in the product line 50. The HPNA concentration can alternatively be determined manually by taking a sample from the product line 50 to a lab for HPNA concentration analysis. The HPNA concentration measuring device may signal the measured HPNA concentration value to a computer 40. The computer or an operator may determine if the measured HPNA concentration of the adsorbed stream in product line 50 exceeds a predetermined HPNA concentration maximum value. If the measured HPNA concentration of the adsorbed stream exceeds the predetermined HPNA concentration maximum value, the computer 40 or the operator may send a signal to close or an operator may close the upstream control valve on the upstream withdraw line 22a and send a signal to open or the operator opens a downstream control valve on a downstream withdraw line 23a for a downstream adsorbent bed 23 of the multiple adsorbent beds. The adjustment from the initial condition to the adjusted condition operates to vary the space velocity because the stripped stream effectively contacts adsorbent in two adsorbent beds 22 and 23 in the adjusted condition as opposed to just a single bed 22 as in the initial condition to adjust the HPNA concentration of the adsorbed stream back to at or below the predetermined concentration. Preferably, the downstream adsorbent bed 23 is the adsorbent bed in the series downstream and adjacent to the upstream adsorbent bed 22. In the adjusted condition, a control valve on the withdraw line 23a may become an upstream control valve on an upstream withdraw line 23a that is open while a downstream control valves on withdraw lines 24a and 25a are closed. Additionally, the previous upstream control valve on the previous upstream withdraw line 22a in the initial condition remains closed.

If the measured HPNA concentration of the adsorbed stream exceeds the predetermined HPNA concentration maximum value in the adjusted condition, the computer 40 or an operator may send a signal to close or the operator may close the upstream control valve on the upstream withdraw line 23a and the computer 40 or an operator may send a signal to open or the operator may open a downstream control valve on a downstream withdraw line 24a for a downstream adsorbent bed 24 of the multiple adsorbent beds. The adjustment from the adjusted condition to a second adjusted condition operates to vary the space velocity because the stripped stream effectively contacts adsorbent in three adsorbent beds 22, 23 and 24 in the second adjusted condition as opposed to just two beds 22, 23 as in the adjusted condition to adjust the HPNA concentration of the adsorbed stream back to at or below the predetermined concentration. Preferably, the downstream adsorbent bed 24 is the adsorbent bed in the series downstream and adjacent to the upstream adsorbent bed 23. In the second adjusted condition, a control valve on the withdraw line 24*a* may become an upstream control valve on an upstream withdraw line 24*a* that is open while a downstream control valves on the withdraw line 25*a* is closed. Additionally, previous upstream control valves on previous upstream withdraw lines 22*a*, 23*a* in the adjusted condition remain closed.

If the measured HPNA concentration of the adsorbed stream exceeds the predetermined HPNA concentration maximum value in the second adjusted condition, the computer 40 or an operator sends a signal to close or the operator closes the upstream control valve on the upstream withdraw line 24*a*, and the computer 40 or an operator sends a signal to open or the operator opens a downstream control valve on a downstream withdraw line 25*a* for a downstream adsorbent bed 25 of the multiple adsorbent beds. The adjustment from the second adjusted condition to a final adjusted condition operates to vary the space velocity because the stripped stream effectively contacts adsorbent in four adsorbent beds 22, 23, 24 and 25 in the final adjusted condition as opposed to just three beds 22, 23 and 24 as in the second adjusted condition to adjust the HPNA concentration of the adsorbed stream back to at or below the predetermined concentration. Preferably, the downstream adsorbent bed 25 is the adsorbent bed in the series downstream and adjacent to the upstream adsorbent bed 24. In the final adjusted condition, a control valve on the withdraw line 25*a* is open. Additionally, previous upstream control valves on previous upstream withdraw lines 22*a*, 23*a*, 24*a* in the second adjusted condition remain closed.

An additional renewal adsorbent bed 44 is provided in parallel to the multiple adsorbent beds 22-25 for adsorbing HPNAs from the stripped stream when flow of the stripped stream to the multiple adsorbent beds is closed. If the measured HPNA concentration of the adsorbed stream in the product line 50 exceeds the predetermined HPNA concentration maximum value in the final adjusted condition, the computer or an operator sends a signal to close or the operator closes the control valve on the adsorbent feed line 26 and the computer or an operator sends a signal to open or the operator opens a control valve on a renewal line 42 to a renewal adsorbent bed 44 which is not in series with the multiple adsorbent beds 22-25 but may be in parallel thereto. The renewal adsorbent bed 44 may be in a separate vessel. The flow of the stripped stream in line 168 to the multiple adsorbent beds 22-25 in series is stopped or closed, to enable replacement or regeneration of one or more of the multiple adsorbent beds 22-25. To enable the hydrocracking process to continue, the stripped stream is fed through line 42 to the renewal adsorbent bed 44 to continue adsorption of HPNAs from the stripped stream while the flow to the multiple adsorbent beds 22-25 is closed. Once the measured concentration of HPNAs in product line 50 exceeds the predetermined HPNA concentration maximum value and the regeneration or replacement of adsorbent beds 22-25 is finished, the computer 40 or an operator signals to close or an operator closes the control valves on renewal line 42 and withdraw lines 23*a*-25*a*, and the computer 40 or an operator signals to open or an operator opens the control valves on the adsorbent feed line 26 and the withdraw line 22*a*, and the process resumes. Line 30 may recycle adsorbed liquid by means of a pump to the stripped line 168 to ensure adequate distribution of liquid across the adsorbent beds 22-25 and 44.

When the measured HPNA concentration value of the adsorbed stream in product line 50 falls below a predetermined minimum value, the computer 40 or an operator may signal to close or partially close or an operator may close or partially close a control valve on the adsorption feed line 26 or on the renewal line 42, and the computer 40 or an operator may signal to open or partially open or an operator may to open or partially open a control valve on a bypass line 32 to allow a portion or all of the stripped stream in the stripped line 168 to bypass the adsorbent beds 22-25 and 44. This may be beneficial when a downstream control valve on withdraw lines 22*a*-25*a* or on renewal line 42 is opened to allow a downstream adsorbent bed to go on line with fresh adsorbent that may adsorb more HPNAs than necessary to meet a HPNA specification for the adsorbed stream. Once the HPNA concentration of the adsorbed stream in product line 50 exceeds the predetermined minimum value, on the adsorption feed line 26 or the renewal line 42, whichever was recently closed to allow bypass, and the computer or an operator can signal closing or partial closing or an operator may close or partially close the control valve on bypass line 32. The valves mentioned may be partially closed or opened to more finely control the HPNA concentration of the adsorbed stream in the product line 50.

The measuring and adjustment steps in the process may be performed manually as well as automatically.

The adsorbed stream in product line 50 may have an HPNA concentration between about 150 and 600 wppm. Because the HPNA concentration of the adsorbed stream is sufficiently low, the stream can be used for lube oil stock, FCC feed or coker feed or fed to a crude column, back to the hydrocracking reactor 100 or be cooled and sent to storage or transported for future use without fear of fouling equipment.

In the adsorption zone 200, the stripped stream may be contacted with a suitable adsorbent, which may selectively retain the HPNA compounds. Suitable adsorbents may include one or more of a molecular sieve, a silica gel, an activated carbon, an activated alumina, a silica-alumina gel, and a clay. The adsorbent may be installed in each adsorbent bed 22-25 and 44 in any suitable manner, such as in a fixed bed arrangement. The adsorbent beds 22-25 and 44 can be maintained at a pressure from about 170 to about 4,300 kPa, a temperature from about 10 to about 370° C., and an LHSV from about 0.1 to about 500 $hr^{-1}$. The flow of the hydrocarbons through the vessel 20 may be conducted in an upflow, downflow or radial flow manner with the hydrocarbons in the liquid phase.

SPECIFIC EMBODIMENTS

While the following is described in conjunction with specific embodiments, it will be understood that this description is intended to illustrate and not limit the scope of the preceding description and the appended claims.

A first embodiment of the invention is a process for hydrocracking, comprising hydrocracking a hydrocarbon feed stream over a hydrocracking catalyst in the presence of hydrogen to provide a hydrocracked stream; separating the hydrocracked stream to provide a liquid hydrocracked stream; fractionating the liquid hydrocracked stream to provide a fractionated bottoms stream; stripping at least a portion of the bottom stream to provide a stripped stream rich in HPNAs and a stream lean in HPNAs; adsorbing HPNAs from the stripped stream to provide an adsorbed stream with an HPNA concentration; measuring the HPNA concentration of the adsorbed stream; and adjusting the HPNA concentration of the adsorbed stream. An embodiment of the invention is one, any or all of prior embodiments in this paragraph up through the first embodiment in this paragraph, further comprising adsorbing the stripped stream over multiple adsorbent beds in series. An embodiment of the invention is one, any or all of prior embodiments in this paragraph up through the first embodiment in this paragraph, wherein the multiple adsorbent beds are in the same vessel. An embodiment of the invention is one, any or all of prior embodiments in this paragraph up through the first embodiment in this paragraph, further comprising varying the space velocity of the adsorption step. An embodiment of the invention is one, any or all of prior embodiments in this paragraph up through the first embodiment in this paragraph, wherein each adsorbent bed has a withdraw line in the bed and a control valve on the withdraw line. An embodiment of the invention is one, any or all of prior embodiments in this paragraph up through the first embodiment in this paragraph, further comprising feeding the stripped stream to an upstream adsorbent bed of the multiple adsorbent beds with an upstream control valve on an upstream withdraw line for the upstream adsorbent bed open and when the measured HPNA concentration of the adsorbed stream exceeds a predetermined value, closing the upstream control valve and opening a downstream control valve on a downstream withdraw line for a downstream adsorbent bed of the multiple adsorbent beds. An embodiment of the invention is one, any or all of prior embodiments in this paragraph up through the first embodiment in this paragraph, further comprising closing flow of the stripped stream to the multiple adsorbent beds in series to replace or regenerate one or more of the multiple adsorbent beds. An embodiment of the invention is one, any or all of prior embodiments in this paragraph up through the first embodiment in this paragraph, further comprising feeding flow of the stripped stream to another adsorbent bed while the flow to the multiple adsorbent beds is closed. An embodiment of the invention is one, any or all of prior embodiments in this paragraph up through the first embodiment in this paragraph, further comprising recycling a portion of the adsorbed stream to the adsorption step. An embodiment of the invention is one, any or all of prior embodiments in this paragraph up through the first embodiment in this paragraph, wherein the HPNA concentration of the stripped stream is about 900 to about 1500 wppm and the HPNA concentration of the adsorbed stream is about 150 to about 600 wppm. An embodiment of the invention is one, any or all of prior embodiments in this paragraph up through the first embodiment in this paragraph, comprising bypassing the stripped stream around the adsorbent beds when the HPNA concentration of the adsorbed stream falls below a predetermined value.

A second embodiment of the invention is a process for hydrocracking, comprising hydrocracking a hydrocarbon feed stream over a hydrocracking catalyst in the presence of hydrogen to provide a hydrocracked stream; fractionating the liquid hydrocracked stream to provide a fractionated bottoms stream; stripping at least a portion of the bottom stream to provide a stripped stream rich in HPNAs and a stream lean in HPNAs; adsorbing HPNAs from the stripped stream over multiple adsorbent beds in series to provide an adsorbed stream with an HPNA concentration. An embodiment of the invention is one, any or all of prior embodiments in this paragraph up through the second embodiment in this paragraph, further comprising measuring an HPNA concentration of the adsorbed stream and adjusting the HPNA concentration of the adsorbed stream. An embodiment of the invention is one, any or all of prior embodiments in this paragraph up through the second embodiment in this paragraph, wherein the multiple adsorbent beds are in the same vessel. An embodiment of the invention is one, any or all of prior embodiments in this paragraph up through the second embodiment in this paragraph, further comprising feeding the stripped stream to an upstream adsorbent bed of the multiple adsorbent beds with an upstream control valve on an upstream withdraw line for the upstream adsorbent bed open and subsequently closing the upstream control valve and opening a downstream control valve on a downstream withdraw line for a downstream adsorbent bed of the multiple adsorbent beds. An embodiment of the invention is one, any or all of prior embodiments in this paragraph up through the second embodiment in this paragraph, further comprising closing flow of the stripped stream to the multiple adsorbent beds in series to replace or regenerate one or more of the multiple adsorbent beds; and feeding flow of the stripped stream to another adsorbent bed while the flow to the multiple adsorbent beds is closed.

A third embodiment of the invention is an apparatus for hydrocracking, comprising a hydrocracking reactor; a fractionation column in communication with the hydrocracking reactor for fractionating a hydrocracked stream; a stripping column in communication with the fractionation column for stripping a fractionated stream; and an adsorption zone in communication with the stripping column for adsorbing HPNAs in the stripped stream over multiple adsorbent beds in series. An embodiment of the invention is one, any or all of prior embodiments in this paragraph up through the third embodiment in this paragraph, wherein the multiple adsorbent beds are in the same vessel. An embodiment of the invention is one, any or all of prior embodiments in this paragraph up through the third embodiment in this paragraph further comprising a withdraw line on each adsorbent bed in the multiple adsorbent beds and a control valve on each withdraw line. An embodiment of the invention is one, any or all of prior embodiments in this paragraph up through the third embodiment in this paragraph further comprising an additional adsorbent bed in parallel to the multiple adsorbent beds for adsorbing HPNAs from the stripped stream when flow of the stripped stream to the multiple adsorbent beds is closed.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for hydrocracking, comprising:
hydrocracking a hydrocarbon feed stream over a hydrocracking catalyst in the presence of hydrogen to provide a hydrocracked stream;
separating the hydrocracked stream to provide a liquid hydrocracked stream;
fractionating the liquid hydrocracked stream to provide a fractionated bottoms stream;
stripping at least a portion of the bottom stream to provide a stripped stream rich in HPNAs and a stream lean in HPNAs;
passing the stripped stream through an adsorption zone to adsorb HPNAs from the stripped stream to provide an adsorbed stream with an HPNA concentration;
measuring the HPNA concentration of the adsorbed stream; and
controlling the flow of the stripped stream through the adsorption zone to adjust the HPNA concentration of the adsorbed stream.

2. The process according to claim 1, further comprising adsorbing the stripped stream over multiple adsorbent beds in series.

3. The process according to claim 2, wherein the multiple adsorbent beds are in the same vessel.

4. The process according to claim 2, further comprising varying the space velocity of the adsorption step.

5. The process according to claim 4, wherein each adsorbent bed has a withdraw line in the bed and a control valve on the withdraw line.

6. The process according to claim 5, further comprising feeding the stripped stream to an upstream adsorbent bed of the multiple adsorbent beds with an upstream control valve on an upstream withdraw line for the upstream adsorbent bed open and when the measured HPNA concentration of the adsorbed stream exceeds a predetermined value, closing the upstream control valve and opening a downstream control valve on a downstream withdraw line for a downstream adsorbent bed of the multiple adsorbent beds.

7. The process according to claim 6, further comprising closing flow of the stripped stream to the multiple adsorbent beds in series to replace or regenerate one or more of the multiple adsorbent beds.

8. The process according to claim 7, further comprising feeding flow of the stripped stream to another adsorbent bed while the flow to the multiple adsorbent beds is closed.

9. The process according to claim 2, further comprising recycling a portion of the adsorbed stream to the adsorption step.

10. The process according to claim 2, wherein the HPNA concentration of the stripped stream is about 900 to about 1500 wppm and the HPNA concentration of the adsorbed stream is about 150 to about 600 wppm.

11. The process according to claim 2, comprising bypassing the stripped stream around the adsorbent beds when the HPNA concentration of the adsorbed stream falls below a predetermined value.

12. A process for hydrocracking, comprising:
hydrocracking a hydrocarbon feed stream over a hydrocracking catalyst in the presence of hydrogen to provide a hydrocracked stream;
fractionating the liquid hydrocracked stream to provide a fractionated bottoms stream;
stripping at least a portion of the bottom stream to provide a stripped stream rich in HPNAs and a stream lean in HPNAs; and
adsorbing HPNAs from the stripped stream rich in HPNAs over multiple adsorbent beds in series by feeding the stripped stream rich in HPNAs to an upstream adsorbent bed of the multiple adsorbent beds with an upstream control valve on an upstream withdraw line for the upstream adsorbent bed open and subsequently closing the upstream control valve and opening a downstream control valve on a downstream withdraw line for a downstream adsorbent bed of the multiple adsorbent beds to provide an adsorbed stream with an HPNA concentration.

13. The process according to claim 12, further comprising measuring an HPNA concentration of the adsorbed stream and controlling the flow of the stripped stream through the multiple adsorbent beds in series to adjust the HPNA concentration of the adsorbed stream.

14. The process according to claim 12, wherein the multiple adsorbent beds are in the same vessel.

15. The process according to claim 12, further comprising closing flow of the stripped stream rich in HPNAs to the multiple adsorbent beds in series to replace or regenerate one or more of the multiple adsorbent beds; and feeding flow of the stripped stream to another adsorbent bed while the flow to the multiple adsorbent beds is closed.

16. An apparatus for hydrocracking, comprising:
a hydrocracking reactor;
a fractionation column in communication with the hydrocracking reactor for fractionating a hydrocracked stream;
a stripping column in communication with the fractionation column for stripping a fractionated stream; and
an adsorption zone, including multiple adsorbent beds in series, in communication with stripping column, for adsorbing HPNAs in said stripped stream, wherein each adsorbent bed in the multiple adsorbent beds comprises a withdraw line with a control valve on each withdraw line.

17. The apparatus according to claim 16, wherein said multiple adsorbent beds are in the same vessel.

18. The apparatus according to claim 16 further comprising an additional adsorbent bed in parallel to said multiple adsorbent beds for adsorbing HPNAs from the stripped stream when flow of the stripped stream to said multiple adsorbent beds is closed.

* * * * *